United States Patent
Warren et al.

[11] Patent Number: 6,047,611
[45] Date of Patent: Apr. 11, 2000

[54] COLLAPSIBLE CONTROL LEVER

[76] Inventors: Vincent M. Warren, deceased, late of Sweet Home, Oreg.; by Loretta E. Warren, personal representative, 560 43$^{rd}$ Ave., Sweet Home, Oreg. 97386

[21] Appl. No.: 08/982,130

[22] Filed: Dec. 1, 1997

[51] Int. Cl.$^7$ .............................. G05G 11/00; F16C 1/10
[52] U.S. Cl. ............................................. 74/489; 74/502.2
[58] Field of Search ............................. 74/489, 523, 524, 74/527, 547, 528, 502.2, 107, 56; 464/37–39; 248/548, 900

[56] References Cited

U.S. PATENT DOCUMENTS

| | | | |
|---|---|---|---|
| 3,294,203 | 12/1966 | Wier | 74/107 |
| 3,803,937 | 4/1974 | Johnston | 74/502.2 X |
| 4,667,785 | 5/1987 | Toyoda et al. | 74/502.2 X |
| 4,726,252 | 2/1988 | Dawson . | |
| 4,730,509 | 3/1988 | Hornady . | |
| 4,789,232 | 12/1988 | Urbanek | 248/900 |
| 4,840,082 | 6/1989 | Terashima et al. | 74/523 |
| 5,062,315 | 11/1991 | Yoshigai | 74/502.2 |
| 5,609,066 | 3/1997 | Bunker et al. | 74/524 X |

*Primary Examiner*—Tamara L. Graysay
*Assistant Examiner*—Marcus Charles
*Attorney, Agent, or Firm*—Banner & Witcoff, Ltd.

[57] ABSTRACT

A collapsible control lever for use with a control system having levers including a conventional cable control lever system such as those found on motorcycles and bicycles. The lever has three independent axes of rotation about which sections of the lever rotate during impact to deflect the impact force. However, the lever remains rigid in the direction of the applied control force when in its operational position during normal operation. The lever restores itself to its operational position following impact with minimal user assistance. The lever may be sized and shaped to be easily retrofit into existing known pivot bases, and at least one of the pivots may include an improved swivel pivot that is sealed from mud and other debris in its operational configuration. The improved swivel pivot has a first and second generally cylindrical frame portion that rotate about a pivot pin with each frame portion having a sliding surface with a smoothly alternating concave and convex-shaped sliding surface. The two surfaces are in intermeshed alignient when the lever is in its operational configuration. The two surfaces slide out of intermeshed alignment during impact. A coil spring received within the frame portions urges the two frame portions toward each other and the misaligned concave and convex surfaces urge the frame portions to rotate to restore the sliding surfaces into intermeshed alignment following an impact.

18 Claims, 2 Drawing Sheets

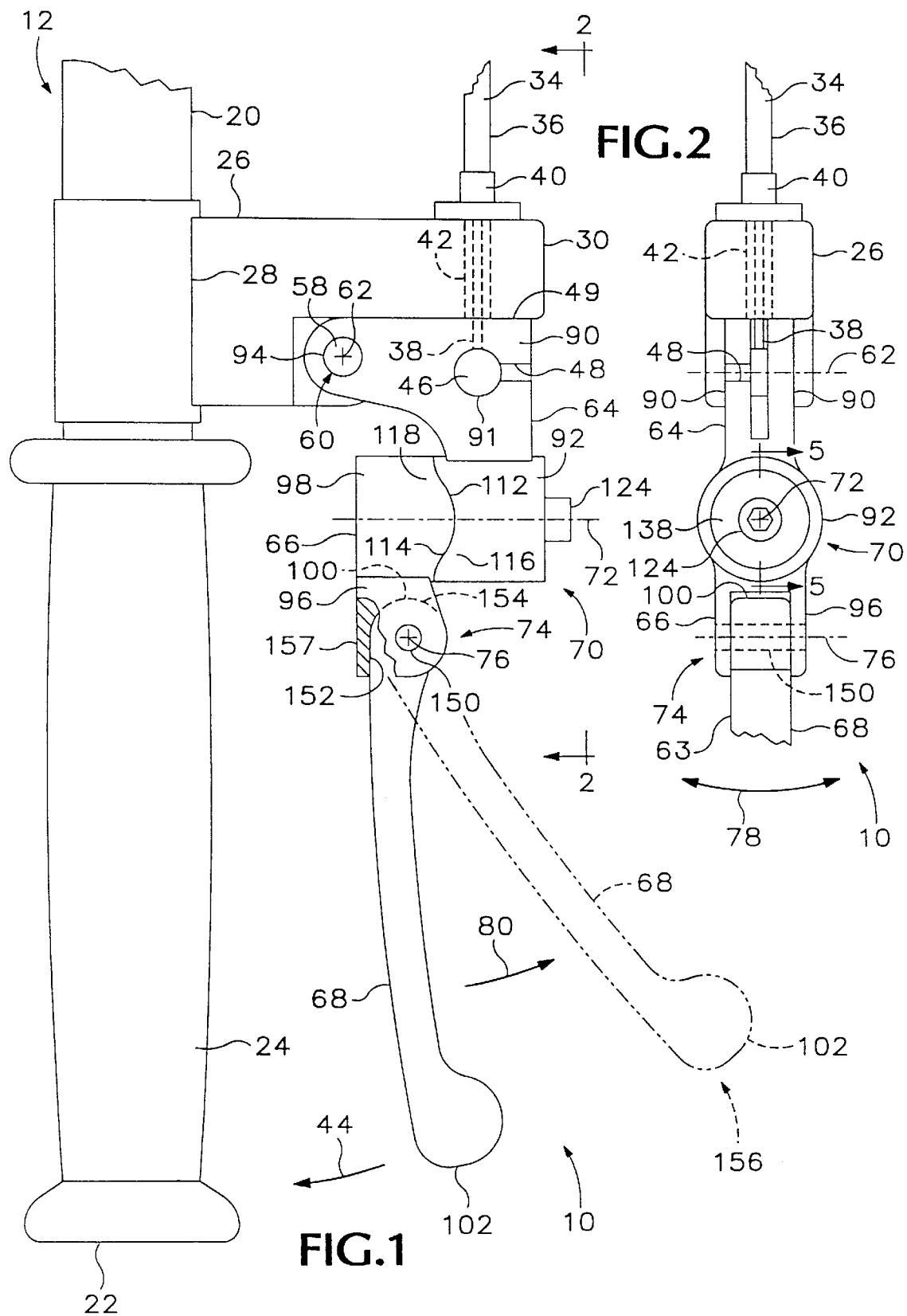

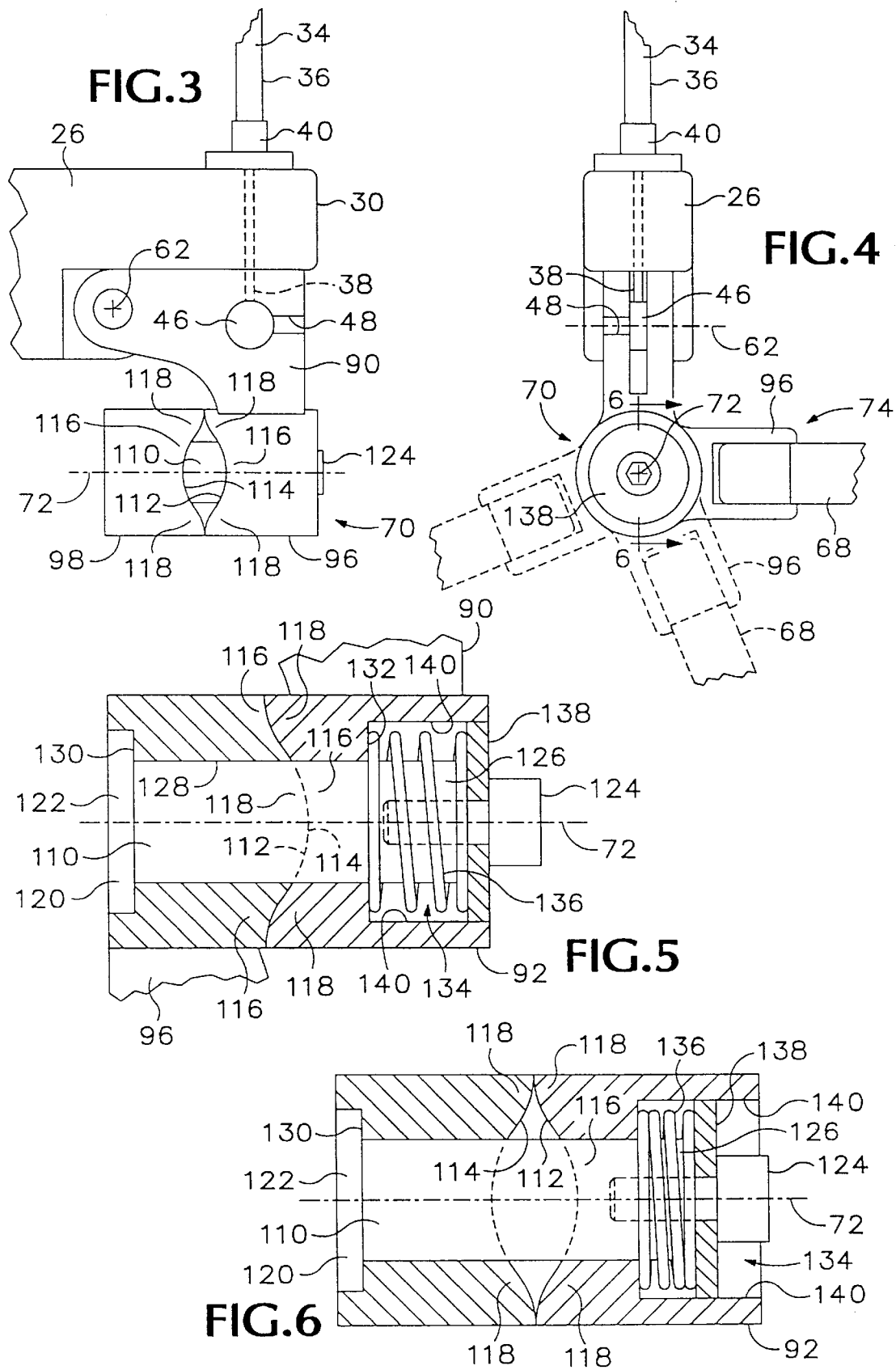

COLLAPSIBLE CONTROL LEVER

The present invention relates to a collapsible and recoverable control lever for use with systems having control levers including hand-operated cable control systems such as brake and clutch levers on motorcycles, brake levers on bicycles, other control lever systems, and the like.

BACKGROUND OF THE INVENTION

Elongate levers used on control systems are susceptible to breakage caused by inadvertent impact. For example, motorcycles and bicycles are susceptible to spills and falls, particularly when being used in a race or off-road. The familiar brake and clutch cable control lever assemblies on a motorcycle, which are mounted on the front of the motorcycle handlebars, are particularly vulnerable to impact and fracture during these incidents, even during relatively minor spills and falls. Similarly, motorcycle drivers themselves can be injured during a spill or fall by impact with these lever assemblies.

A broken brake or clutch lever assembly arising during a spill renders an otherwise functional motorcycle inoperative. Such an incident can be particularly troublesome during a race, where time lost replacing a broken lever assembly will usually result in losing the race, or during off-road operations, where assistance is usually a great distance away.

Several inventors have recognized this problem and attempted to solve it. For example, see U.S. Pat. No. 4,088,040 to Ross-Myring, U.S. Pat. No. 4,726,252 to Dawson, and U.S. Pat. No. 4,730,509 to Homady. In general, they have attempted to solve this problem in one of the following three ways.

One attempted improvement involves designing a lever handle that toggles in any direction with respect to a base extending from the motorcycle handlebar. An example of this attempted improvement may be found in U.S. Pat. No. 4,088,040 to Ross-Myring. Unfortunately, the increased range of motion of these types of levers prevents them from having a clearly defined control motion during use. Such lack of a defined control motion adversely affects the controllability of the lever.

A second attempted improvement involves allowing the lever to breakaway from its mount during impact. One such improvement is described in U.S. Pat. No. 4,730,509 to Hornady. In general, with these types of devices, the lever handle is detachably secured to a base at its pivot point such that it detaches from the base upon impact. However, considerable user time and attention is required to reinstall the lever handle on the base. Moreover, because the lever handle is completely detached from the base on impact, there is an increased risk of outright losing the detached lever in mud or other adverse terrain during the spill or fall.

Finally, some inventors have attempted to overcome the problems with known control lever systems by providing a second axis of rotation to the lever. U.S. Pat. No. 4,726,252 to Dawson is an example of this type of attempted improvement. In general, in addition to the typical pivot axis, about which the lever is rotated to actuate the control cable, the handle assembly has a second axis of rotation, usually biased to a neutral operational position, to deflect the lever assembly on impact.

However, several problems with these types of lever assemblies have arisen. First, because only one additional axis of rotation is provided, the ability of the lever handle to absorb the impact by deflecting about this second axis depends on the actual direction of force applied to the lever assembly by the impact. In many cases, the force of the impact is aligned with the second axis of rotation precluding the handle lever from rotating about this axis on impact. Second, the known means for allowing the handle lever to pivot about an axis are prone to fill with water, dirt, and debris, further inhibiting their ability to function properly on impact. Third, these known pivot designs are prone to become easily displaced from their neutral operational position, even during normal operation, thereby adversely impacting the controllability of the motorcycle during critical times such as racing and off-road operations. And fourth, many of the known designs are bulky devices that are not easily retrofit into the existing control lever pivot bases installed on most motorcycles.

Accordingly, despite the attempted improvements, there remains a need for a collapsible control lever system with a defined control motion during normal operation that is able to absorb a wide variety of impacts without breaking and quickly restore itself to its working configuration following impact.

SUMMARY OF THE INVENTION

Fulfilling the forgoing needs is the primary objective of the invention. More specific objectives of the invention are to provide a collapsible control lever and system that:
(1) provides a defined control motion during normal operation to actuate a control cable;
(2) absorbs a wide variety of impact forces without breaking;
(3) is collapsible about at least three different axis of rotation upon impact without any components breaking-away on impact;
(4) is biased to a neutral operational position during normal operation;
(5) automatically restores itself to its neutral operational position following impact with minimal operator involvement;
(6) provides an improved pivot means that is protected from water, mud, and debris,;
(7) provides an improved pivot means that securely holds the control level in its operational position during normal operation;
(8) is readily retrofit into existing commercially available control lever pivot mounts;
(9) is not heavy or bulky;
(10) is easily and inexpensively constructed with known materials and construction techniques; and
(11) provides a low cost, easy to maintain, reliable, relatively simple and inexpensive solution to the known problems of hand-operated control levers.

The invention is a collapsible control lever for use with control systems having levers including a conventional cable control lever system. The lever has three independent axes of rotation about which sections of the lever rotate during impact to absorb the impact force. However, the lever remains stable in the direction of the applied control force when in its operational position during normal operation. The lever restores itself to its operational position following impact.

In a preferred embodiment, the lever is sized and shaped to be easily retrofit into existing known pivot bases, and at least one of the pivot points includes an improved swivel pivot that is generally resistant to entry of mud and other debris in its operational configuration. More specifically, the improved swivel pivot has first and second generally cylindrical frame portions that rotate about a pivot shaft with each frame portion having a sliding surface. These sliding surfaces slide against each other as the frame portions rotate about the pivot shaft. The profiles of the sliding surfaces are smoothly alternating concave-shaped and convex-shaped surfaces, with the convex-shaped surface of one of the two surfaces being able to tightly intermesh with the concave-shaped surface of the other of the two surfaces when the lever is in its operational position and protect the internal workings of the pivot from contamination. The two surfaces slide out of intermeshed alignment during impact. A coil spring received within the frame portions urges the two frame portions toward each other and thereby urges the sliding surfaces into the intermeshed operational configuration.

The foregoing and other objects, features and advantages of the invention will become more apparent from the following detailed description of a preferred embodiment which proceeds with reference to the accompanying drawings.

BRIEF DESCRIPTION OF THE DRAWINGS

FIG. 1 is a plan view of a portion of a handle bar having a conventional cable control lever pivot base and a collapsible control lever with an improved swivel pivot in its operational configuration in accordance with the preferred embodiment of the present invention. A dashed outline of a possible collapsed position of the control lever is also shown.

FIG. 2 is a fragmentary view taken generally along line 2—2 in FIG. 1.

FIG. 3 is a fragmentary view similar to a portion of FIG. 1 showing the improved pivot device in one deflected position.

FIG. 4 is an enlarged fragmentary view similar to a portion of FIG. 3 showing the device in a possible deflected position and a dashed outline of the device in an alternative deflected position.

FIG. 5 is an enlarged cross-sectional view of the device in the operational position taken along lines 5—5 of FIG. 2.

FIG. 6 is an enlarged cross-sectional view of the device in a deflected position taken along line 6—6 of FIG. 4.

DETAILED DESCRIPTION OF A PREFERRED EMBODIMENT

A collapsible lever 10 constructed accordingly to an embodiment of the invention for use, in the present case, with a cable lever control system 12 is shown in FIGS. 1–6.

The construction and use of such a cable lever control system 12 is known. Accordingly, to provide a comprehensive disclosure without unduly lengthening the specification, this specification incorporates by reference the disclosures of U.S. Pat. Nos. 4,088,040 to Ross-Myring, 4,726,252 to Dawson, and 4,730,509 to Homady. These references provide greater detail regarding the general construction and use of cable lever control systems.

In general, as shown in FIG. 1, the cable lever control system 12 includes a handlebar 20 having an end 22 with the cable control system 12 secured near said end. A handle grip 24, usually constructed of a resilient material, is secured to the end portion of the handlebar 20. A pivot mount 26 extends from the handlebar 20 generally perpendicular to and near the handle grip 24 and is secured to the handlebar 20 with known materials and methods. The pivot mount 26 has a base, or first, end 28, a cable, or second, end 30, and a lever pivot hole (not shown).

A cable 34 having a protective outer sheath 36 and two opposed ends is operably connected to the cable end of the pivot mount base at one end 38 of the cable 34 with known methods. A threaded mount 40 grips a portion of sheath 36 to secure it in place. An end portion of cable 34 with the outer sheath 36 removed extends through an opening 42 in the pivot base 26 generally parallel to the handle bar 20. The cable is sized and shaped to slide freely through the pivot base 26 and within the protective outer sheathing 36. The opposite end (not shown) of the cable is operably secured to the device being controlled such as a brake or clutch system (not shown).

Previously the usual control lever has been a rigid L-shaped member. It has been pivotally mounted on the pivot base at the juncture of the two legs of the L. Its longer leg extends from the pivot generally parallel to the handle grip 24. The end (here end 38) of the cable 34 that extends through the pivot base 26 has been operably secured to the short leg of the L such that when a user pivots the lever toward the handle bar, such as in the direction of first arrow 44, the cable is pulled by a predetermined distance to activate the device being controlled.

One known method for securing the end 38 of the cable 34 to a lever involves securing the cable to a rigid cable retaining pin 46 and securing the cable retaining pin 46 in a slot 48 received within the lever. Tension on the cable returns the lever to its normal position generally parallel to the handle bar when the user releases the lever. A defined stop 49 prevents the usual control lever from pivoting away from the handlebar beyond a defined point.

As best shown in FIGS. 1 & 2, the collapsible lever 10 of the present invention replaces the previously known lever generally described above. Here the collapsible lever 10 is pivotally secured to the pivot base 26 at pivot hole 32 with known means such as with a rigid first pivot pin 58, thus providing a first pivot 60 and a first axis of rotation 62 for the lever 10.

The collapsible lever 10 includes three sections: a base, or first, section 64, an intermediate, or second section 66, and an elongate handle, or third section 68. The handle 68 is joined through intermediate section 66 to base section 64 in such a way as to provide two separate pivots: a swivel, or second pivot 70 providing a second axis of rotation 72, and a hinge, or third pivot 74 providing a third axis of rotation 76. The three sections 64, 66, 68 are joined together to form the lever 10 having an overall elongate size roughly similar to previously known levers.

More specifically, base section 64 is pivotally connected to the pivot base 26 via pivot pin 58 as set out above. The base section also is joined to intermediate section 66 at swivel pivot 70, and intermediate section 66 is joined to handle section 68 at hinge pivot 74. The pivots are biased to a neutral position in which the sections assume the operational position shown in solid lines in FIG. 1. Preferably, the second axis of rotation 72 at swivel pivot 70 is generally perpendicular to the handle grip 24 and permits the intermediate section 66 to pivot relative to the base section 64 in opposite directions as noted by arrow 78 (FIG. 2). The third axis of rotation 76 at hinge pivot 74 is generally parallel to the first axis of rotation 62 and permits the handle section to pivot relative to the intermediate section 66 in the direction of arrow 80 (FIG. 1).

The base section 64 is constructed of a durable rigid material, such as metal, and includes a pair of parallel spaced apart flat plates 90 mounted to a generally cylindrical first frame portion 92 of the swivel pivot 70. The flat plates include a first pivot hole 94 that is sized to be operably aligned with the lever pivot hole 32 on the pivot base 26 to receive pivot pin 58. Means for securing the end (here end 38) of the cable 34 to plates 90 includes holes 91 in plates 90 that receive the cable retaining pin 46 as shown in FIG. 1.

The intermediate section 66 includes a generally U-shaped mount 96 for the hinge pivot 74 mounted to a generally cylindrical second frame portion 98 of the swivel pivot 70. The elongate handle section 68 has a pivot end 100 and a free end 102 and is preferably contoured similar to a traditional lever so that it may be easily grasped by a cyclist. The intermediate and handle sections (66, 68 respectively) are constructed of rigid durable material such as metal.

As best shown in FIG. 5, the intermediate section, or swivel pivot 70 includes the first and second hollow generally cylindrical frame portions (92, 98 respectively) that rotate about a pivot shaft 110 received therein forming the second axis of rotation 72. The first frame portion 92 has a first axially facing sliding surface 112, and the second frame portion 98 has a second axially facing sliding surface 114. These sliding surfaces 112, 114 slide against each other as the frame portions 92, 98 rotate about the pivot shaft 110. The profile of the sliding surfaces 112, 114 reveal that each includes smoothly alternating concave-shaped 116 and convex-shaped 118 surfaces throughout the circumference of each sliding surface 112, 114 with the convex-shaped surface of one of the two surfaces (here sliding surface 114) tightly intermeshed with the concave-shaped surface of the other of the two sliding surfaces (here surface 112) when the lever 10 is in its neutral operational position shown in FIGS. 1 and 5.

The swivel pivot 70 is biased to maintain the lever in its neutral operational position. One means for accomplishing this includes providing an enlarged head 120 at one end 122 of the pivot shaft 110 and securing a threaded member, or bolt, 124 on the opposite end 126 of the shaft 110. The shaft 110 is received within a through hole 128 extending through both the first arid second frame portions (92, 98, respectively) with one of the frame portions (here the first frame portion 92) having a first shoulder 130 sized to receive the head 120 of shaft 110. The other of the first and second frame portions (here the second frame portion 98) includes an inset second shoulder 132 defining a chamber 134 for receiving a coil spring 136 around the opposite end 126 portion of the shaft 110. A flat cap 138, such as a metal washer, is secured at end 126 of the shaft 110 by bolt 124. The head 120 and cap 138 seal these components from mud, moisture, and contamination. Preferably, a suitable grease or lubricant is applied to the contacting surfaces to further protect these components from contamination.

As best shown in FIG. 6, the cap 138 is sized to retain the coil spring 136 within the chamber 134, but slide freely along the radial chamber wall 140. Accordingly, the coil spring 136 urges the cap 138 away from the second shoulder 132, thereby urging the first and second frame portions (92, 98, respectively) axially toward each other.

The alternating concave and convex-shaped sliding surfaces (112, 114, respectively) are stable with respect to each other when they are in their aligned intermeshed operational configuration shown in FIGS. 1, 2, and 5. Accordingly, should a force, such as that from an impact, cause the first and second frame portions (92, 98, respectively) to rotate out of the aligned operational configuration, as shown in FIGS. 3, 4, and 6, the frame portions 92, 98, which are biased toward each other, will be urged by spring 136 to rotate about the pivot shaft 110 so that the sliding surfaces 112, 114 return to the aligned operational configuration as shown in FIGS. 1, 2, and 5 with minimal user attention (if any).

Referring now to FIG. 1, the hinge pivot 74 includes the pivot end 100 of the elongate handle section 68 pivotally secured within the generally U-shaped mount 96 of the intermediate section 66, preferably by a rigid second pivot pin 150. The pivot end 100 of the elongate handle section 68 includes a flat surface 152 and a rounded surface 154 sized and shaped to permit the handle section to pivot freely about the second pivot pin 150 from the operational position 63 (shown in solid lines in FIG. 1) in the direction of arrow 80 to a deflected position 156 (shown in dashed outline in FIG. 1.) However, the flat surface 152 rests tightly against the interior wall 157 of the U-shaped mount 96 when the handle section 68 is in its operational position (FIG. 1). Accordingly, the handle section 68 is precluded from pivoting about second pivot pin 150 toward the handle grip 24.

Preferably, the handle section 68 is biased to the operational position relative to the U-shaped mount 96. One means for accomplishing this includes operably securing a coil spring (not shown) between the pivot end 100 of the handle section 68 and the U-shaped mount 96.

Having described a preferred embodiment of the collapsible lever 10, its use should be apparent. The user of the lever 10 simply installs it on known pivot bases 26 by aligning the first pivot hole 94 on the lever 10 with the lever pivot hole (not shown) on the pivot base 26 and pivotally securing the lever 10 to the pivot base 26 with first pivot pin 58. The user then attaches the cable 34 to the lever as previously described. Once installed, the lever 10 then operates as previously known levers during normal operation pivoting about the first axis of rotation 62 in the direction of arrow 44. The three sections 64, 66, 68 do not pivot with respect to each other when forces are applied in the direction of first arrow 44, providing a defined control motion for the lever 10 in its operational configuration.

Should the cycle encounter a spill or fall, the impact forces contacting the lever 10 will not likely be in the direction of first arrow 44. The lever 10 may deflect under these forces without breaking by pivoting about the additional two axes of rotation 72, 76. In particular, the handle section 68 may freely pivot in the direction of arrow 80 relative to the intermediate section 66, and the intermediate section 66 may pivot in either of opposite directions of second arrow 78 (FIG. 2) relative to the base section 64.

Following the spill or fall, the pivots 70, 74 return the lever 10 to its operational position 63, permitting the motorcycle to continue operating. In particular, during a spill or fall, the alternating concave and convex-shaped sliding surfaces (112, 114, respectively) of swivel pivot 70 may fall out of the axially intermeshed alignment of their operational configuration. However, coil spring 136, and in some extreme cases with additional axial manipulation by the user, swivel pivot, urges the first and second frame portions 92, 98 axially toward each other and back into intermeshed axial alignment, thereby returning swivel pivot 70 to its operational configuration. Similarly, when the impact forces are removed from hinge pivot 74, the coil spring (not shown) positioned between the pivot end 100 of handle section 68 and the U-shaped mount 96, urges handle section back into its operational position as previously described.

Having described and illustrated the principles of the invention with reference a preferred embodiment thereof, it should be apparent that this embodiment can be modified in arrangement and detail without departing from the principles of the invention. For example, although a lever for use on the right side of a handle bar has been described, it should be apparent that the lever described could be readily modified to be used on the left side of a handle bar simply by reversing the orientation of the components involved. Moreover, the shape and size of the base section may be readily modified to fit within a variety of commercially available pivot bases and easily accommodate the familiar brake, clutch, or other cable assemblies found on commercial motorcycles, bicycles and the like. Similarly, it should be apparent that the lever of the present invention could be used equally well with a bicycle or any other device using a cable lever system. Moreover, the lever of the present invention will work equally well in a variety of environments unrelated to cable lever systems such as crank levers, hatch levers, adjustment levers, lever-type door knobs, and the like.

In view of the wide variety of embodiments to which the principles of the invention can be applied, it should be apparent that the detailed embodiment is illustrative only and should not be taken as limiting the scope of the invention. Rather, the claimed invention includes all such modifications as may come within the scope of the following claims and equivalents thereto.

What is claimed is:

1. A collapsible lever including:

a first section pivotally attached to a pivot base defining a first axis of rotation at a first pivot;

a second section pivotally attached to the first section at a second pivot defining a second axis of rotation;

a third section pivotally attached to the second portion at a third pivot defining a third axis of rotation;

said first, second, and third sections forming an elongate member defining an operational position for the lever; and said second and third pivots each including a biasing regulator for basing the first, second, and third sections in the operational position of the lever.

2. The lever of claim 1, wherein when the lever is in its operational position said first axis of rotation and said third axis of rotation are parallel to each other and said second axis of rotation is perpendicular to said first axis of rotation.

3. The lever of claim 2, wherein said first pivot includes a defined stop beyond which the first section will not rotate about the first axis of rotation defining a first range of movement for the first section;

said third pivot includes a second defined stop beyond which the third section will not rotate about the third axis of rotation; and said first and second defined stops positioned at the operational position of the lever such that the third section will not pivot in the same direction as the first section when the first section is within the first range of movement, thereby allowing the first, second, and third sections to pivot about the first axis of rotation as an elongate substantially rigid member.

4. The lever of claim 3, wherein said second member may pivot about said second axis of rotation and said third member may pivot about said third axis of rotation deflecting the lever from the operational position upon application of an impact force.

5. The lever of claim 1, wherein at least one of said pivots is a swivel pivot.

6. The lever of claim 5, wherein said swivel pivot is sealed to protect it from contamination when the lever is in its operational position.

7. A collapsible lever including;

a first section pivotally attached to a pivot base defining a first axis of rotation at a first pivot;

a second section pivotally attached to the first section at a second pivot defining a second axis of rotation;

a third section pivotally attached to the second portion at a third pivot defining a third axis of rotation;

said first, second, and third sections forming an elongate member defining an operational position for the lever;

said second and third pivots each including a biasing regulator for biasing the first, second, and third sections in the operational position of the lever; and at least one of the said pivots including:

a first frame portion having a first sliding surface;

a second frame portion having a second sliding surface;

said first and second frame portions being sized and shaped to rotate about a pivot shaft with said first sliding surface sliding against said second sliding surface during rotation;

said first and second sliding surfaces each having a smoothly alternating concave and convex shape that tightly intermesh with each other when the lever is in its operational position; and means for biasing said first and second sliding surfaces to tightly intermesh with each other.

8. The lever of claim 7, wherein said means for biasing includes:

said shaft having a head at one end and an opposite end and being operably held to said first frame portion by said head;

said second frame portion having a radial chamber for receiving the shaft there through and a spring therein;

a cap secured to said opposite end of said shaft; and said spring extending between said second frame portion within said chamber and said cap and thereby urging said first frame portion toward said second frame portion.

9. The lever of claim 1, wherein at least one said pivot is a hinge pivot.

10. The lever of claim 1, wherein at least one pivot includes:

a U-shaped base having a first pivot hole;

a pivoting member having a second pivot hole operably received within said U-shaped base; and a pivot pin extending through said first and second pivot holes.

11. The lever of claim 10, wherein said biasing regulator includes a spring operably secured between said U-shaped member and said pivoting member to bias said pivoting member to a neutral position.

12. The lever of claim 1, wherein said first member is adapted to be operably connected to a cable of a cable lever control system.

13. The lever of claim 12, wherein the cable lever control system is a brake system on a cycle.

14. The lever of claim 12, wherein the cable lever control system is a clutch system on a cycle.

15. A pivot for use on a collapsible lever comprising:

a first frame portion having a first sliding surface;

a second frame portion having a second sliding surface;

said first and second frame portions being sized and shaped to rotate about a pivot shaft with said first sliding surface sliding against said second sliding surface during rotation;

said first and second sliding surfaces each having a smoothly alternating concave and convex shape that tightly intermesh with each other when the lever is in an operational position; and means for biasing said first and second sliding surfaces to tightly intermesh with each other.

16. The pivot of claim 15, wherein said means for biasing includes:

said shaft having a head at one end and an opposite end and being operably held to said first frame portion by said head;

said second frame portion having a radial chamber for receiving the shaft there through and a spring therein;

a cap secured to said opposite end of said shaft; and said spring extending between said second frame portion within said chamber and said cap and thereby urging said first frame portion toward said second frame portion.

17. The lever of claim 7, wherein said first pivot includes a defined stop beyond which the first section will not rotate about the first axis of rotation defining a first range of movement for the first section;

said third pivot includes a second defined stop beyond which the third section will not rotate about the third axis of rotation; and said first and second defined stops positioned at the operational position of the lever such that the third section will not pivot in the same direction as the first section when the first section is within the first range of movement, thereby allowing the first, second, and third sections to pivot about the first axis of rotation as an elongate substantially rigid member.

18. The lever of claim 17, wherein said second member may pivot about said second axis of rotation and said third member may pivot about said third axis of rotation deflecting the lever from the operational position upon application of an impact force.

* * * * *